United States Patent [19]

Payne

[11] Patent Number: 4,480,670

[45] Date of Patent: * Nov. 6, 1984

[54] TRACK BELT ASSEMBLY

[75] Inventor: Roger E. Payne, Okemos, Mich.

[73] Assignee: The Goodyear Tire & Rubber Company, Akron, Ohio

[ * ] Notice: The portion of the term of this patent subsequent to Oct. 6, 1999 has been disclaimed.

[21] Appl. No.: 221,148

[22] Filed: Dec. 29, 1980

[51] Int. Cl.³ .................. B60C 27/06; B60C 9/18; B62D 55/26; B62D 55/28

[52] U.S. Cl. .................................. 152/169; 152/176; 152/185.1; 152/222; 152/228; 198/699; 198/840; 198/843; 305/19; 305/38

[58] Field of Search ............... 152/169, 170, 173, 175, 152/176, 182, 178–180, 187, 188, 225 R, 226–228, 185.1, 222, 361 R, 330 R; 305/19, 35 R, 35 EB, 38, 54; 238/14; 198/699, 840, 843

[56] References Cited

U.S. PATENT DOCUMENTS

| 872,096 | 11/1907 | Treffiere et al. | 152/169 |
| 1,226,254 | 5/1917 | Rich | 152/176 |
| 3,773,394 | 11/1973 | Grawey | 152/185.1 |
| 3,871,720 | 3/1975 | Mosshart et al. | 152/185.1 |
| 4,010,789 | 3/1977 | Vidakovic et al. | 152/182 |
| 4,013,112 | 3/1977 | Vidakovic | 152/182 |
| 4,043,609 | 8/1977 | Vidakovic et al. | 152/185.1 |
| 4,237,950 | 12/1980 | Domes et al. | 152/175 |

Primary Examiner—Edward C. Kimlin
Assistant Examiner—Thomas Bokan
Attorney, Agent, or Firm—Frank Pincelli

[57] ABSTRACT

An improved track belt assembly wherein the anchor plates have fastening means which are disposed axially inward of the reinforcing belt structure.

15 Claims, 9 Drawing Figures

TRACK BELT ASSEMBLY

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to an improved track belt assembly.

The track belt assembly of the present invention is generally designed for use in large earthmover vehicles which are subjected to high stress and loads under harsh environmental conditions such as in rock quarries, mines, foundries, and other areas where tires are subjected to puncture-producing and wear-inducing elements. Track belt assemblies of the prior art comprise a plurality of ground-engaging shoes spaced about the periphery of the supporting structure. Placed in between the shoes and anchor plates is a reinforcing belt structure. The shoes are generally secured to a single metal anchor plate at its lateral ends by nut and bolt assemblies. The heavy loads on the shoes result in great stresses being developed in the nut/bolt assemblies. Especially high stress concentrations are developed in the areas of the anchor plates surrounding the holes in which the nut/bolt assemblies are passed, which may lead to premature failure. Additionally, since the anchor plates are secured at the lateral ends of the shoes, great bending stresses may be produced in the shoes.

Applicants have invented an improved track belt assembly wherein the stresses developed in the nut and bolt assembly and the bending stresses in the shoes are substantially reduced. Applicant's invention also has the advantage of reduced manufacturing costs due to reduced tolerance requirements.

DETAILED DESCRIPTION OF THE INVENTION

Figure 1:
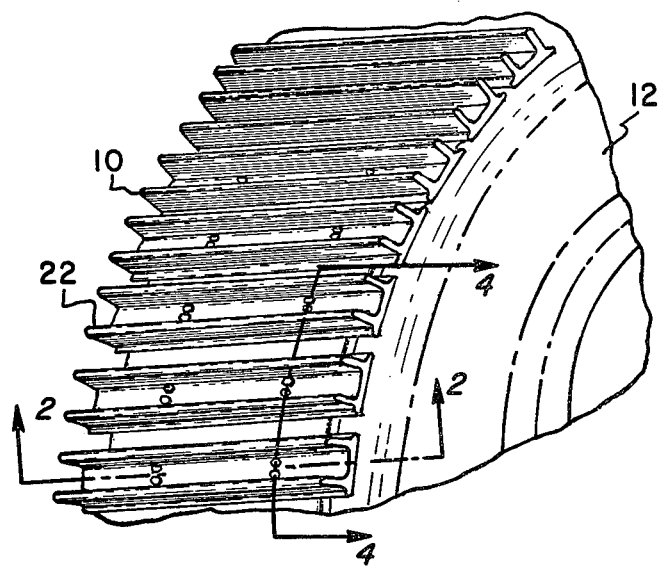
FIG. 1 is a perspective view of a portion of a track belt assembly made in accordance with the present invention mounted on a pneumatic tire.
Figure 2:
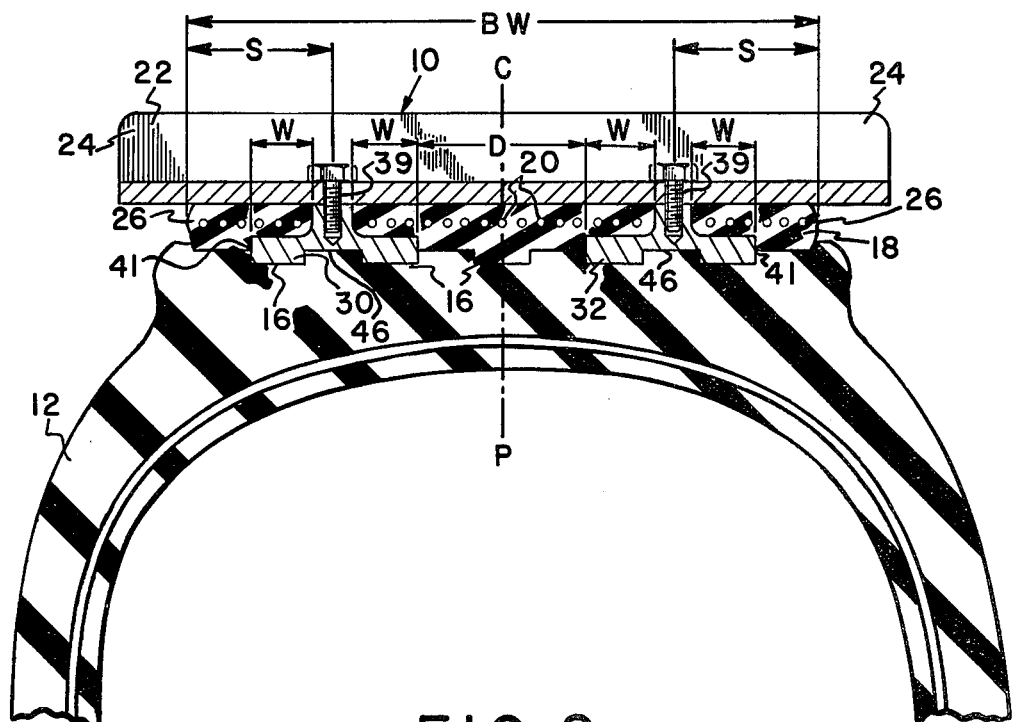
FIG. 2 is a fragmentary transverse cross-sectional view taken along the line 2—2 of FIG. 1.
Figure 3:
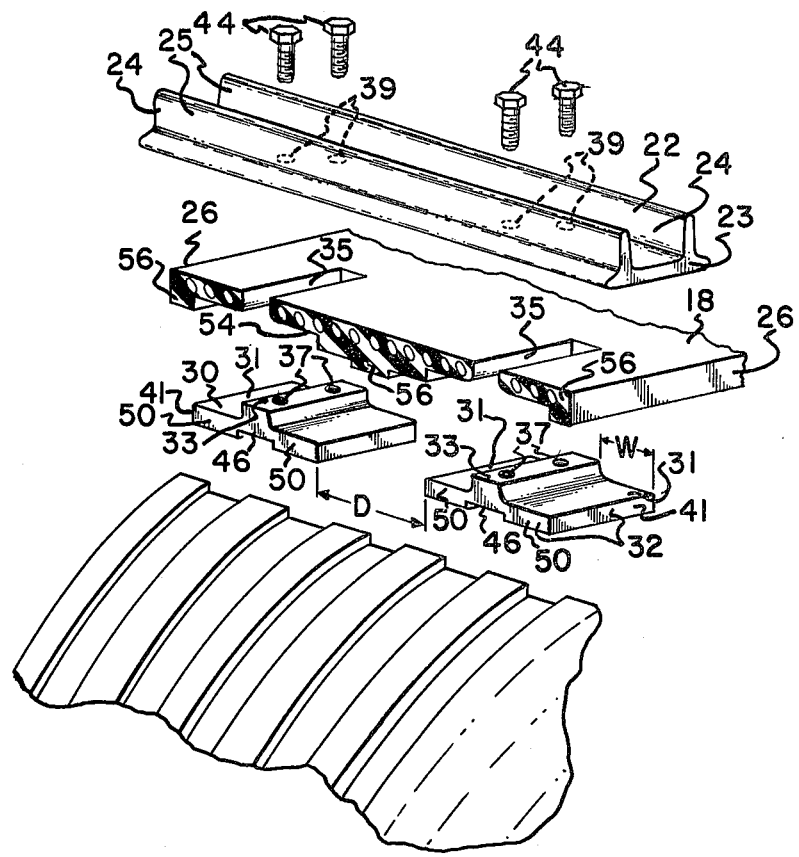
FIG. 3 is an exploded perspective view of FIG. 1 illustrating components of the present invention.
Figure 4:
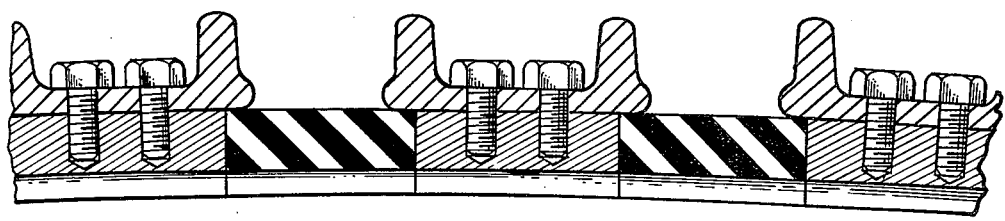
FIG. 4 is a fragmentary cross-sectional view taken along the line 4—4 of FIG. 1.

Referring to FIGS. 1, 2 and 3, there is illustrated a track belt assembly made in accordance with the present invention mounted on a supporting structure 12. In the particular embodiment illustrated, the supporting structure is a pneumatic tire, however, other supporting structures not illustrated may be used for supporting the track belt assembly of the present invention. The tire 12 has a radially outer surface with a plurality of circumferentially extending grooves 16 for receiving projections in the track belt assembly 10. The track belt assembly 10 is provided with a reinforcing belt structure 18 having embedded therein a plurality of substantially inextensible cords 20. In the particular embodiment illustrated, the belt reinforcing structure 18 comprises one layer of cords which lie at an angle of approximately 0° with respect to the mid-circumferential centerplane CP of the tire 12. In the particular embodiment illustrated, a single ply of cords has been helically wound about the periphery of the tire 12, however, the invention is not limited to such. The belt structure 18 may comprise any desired number of layers. The cords of belt structure 18 may be oriented at any desired angle and may be made of any material normally used for reinforcing rubber articles, for example, and not by way of limitation, nylon, fiberglass, aramid, and steel. In the particular embodiment illustrated, the cords 20 are made from steel.

A plurality of ground-engaging shoes 22 are placed about the outer periphery of the belt structure 18. The shoes 22 each have a base portion 23 disposed adjacent the belt structure 18 and a pair of traction members 25 which extend from the side of the base 23 opposite the side adjacent the belt structure 18. While the shoes 22 have been shown as having a substantially channel-shaped, cross-sectional configuration, it is understood that the shoes may have any desired shape or configuration. The shoes 22 each have a pair of lateral ends 24 which extend axially beyond the lateral edges 26 of the belt structure 18.

Referring to FIGS. 2 and 3, there is provided a pair of anchor plates 30, 32 which are mounted on the side of the belt structure 18 opposite the shoe 22. The anchor plates 30, 32 are separated a distance D sufficient to prevent the inner edges of anchor plates 30, 32 from contacting each other. Distance D in the particular embodiment illustrated is about 15 percent of the belt width BW. While the preferred embodiment of the present invention has two separate anchor plates, any desired number of anchor plates may be utilized. The anchor plates 30, 32 are made of a high strength material such as metal or other materials such as composites. The anchor plates 30, 32 each have a clamping surface 31 and a projecting mating portion 33 which is located approximately in the center of the anchor plates 30, 32 and extends through opening 35 in belt structure 18 to mate with its respective shoe 22.

Figure 9:
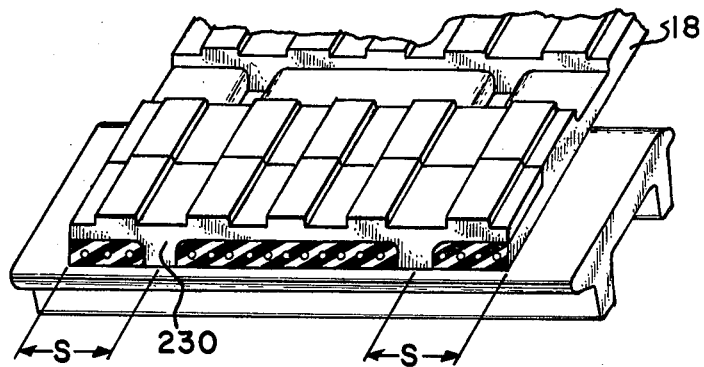

In the particular embodiment illustrated, clamping surfaces 31 are provided on both axial sides of the mating portion 33. This is in contrast to the prior art wherein clamping support is provided on only one side of the fastening means. Clamping surfaces 31 each have a width W, the total amount of clamping surface across the belt structure 18 is 4W for the embodiment illustrated in FIGS. 2 and 3. Preferably the amount of clamp surfaces across each shoe is at least 25 percent of the belt width BW, and in the particular embodiment illustrated is approximately 40 percent of the belt width BW. In the embodiment illustrated, the surfaces 31 are on both sides of the mating portion 33 and are substantially equal in width, however, may be made unequal if desired. The axially outer lateral edges 41 of anchor plates 30, 32 terminate prior to reaching the lateral edges 26 of belt structure 18, however, the present invention is not limited to such as is illustrated in FIG. 9.

The projecting mating portions 33 of anchor plates 30, 32 are each provided with a pair of circumferentially aligned threaded openings 37 which are alignable with openings 39 in shoe 22 and are spaced inward of the belt edges 26. Preferably, the threaded openings 37 are located a distance S from the belt edge 26 of at least 10 percent of the belt width BW and in the particular embodiment illustrated the distance S is approximately 16 percent of the belt width BW. The anchor plates 30, 32 are secured to the shoe 22 by means of a bolt 44 which passes through opening 39 into threaded opening 37 of anchor plates 30, 32. Preferably, some positive locking means is provided so as to minimize loosening of threaded bolt 44. This can be accomplished by a variety of ways as is well known to those skilled in the art of fastening and may be obtained for example, and not by way of limitation, by providing high function threads in the bolt 44 or threaded opening 37. In the particular embodiment illustrated, the means for securing the anchor plates to the shoes is independent of each other in contrast to the prior art wherein a single anchor plate is used with fastening means at each lateral end. Therefore, the present invention has the advantage of reduced tolerance requirement in manufacturing costs and eliminates any undue stress that may result from misalignment of a single anchor plate. While the particular embodiment illustrates the anchor plates 30, 32 as having two threaded openings, any desired number of threaded openings may be utilized. Additionally, the subject invention is not limited to the fastening means disclosed, but may be fastened by any desired means. For example, and not by way of limitation, a nut/bolt assembly may be used wherein the nut is recessed into a recess provided in the anchor plate. Positive locking of the nut in the anchor plate recess is desirable to keep the nut from turning. One of many methods of preventing turning of the nut is to design the recess so as to have a minimum clearance with the sides of the nut.

Figure 5:
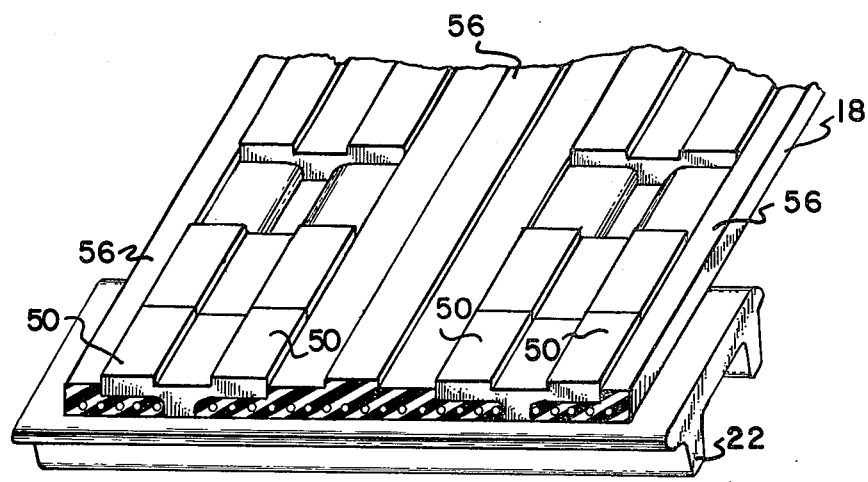
FIG. 5 is a fragmentary perspective view of FIG. 1 as seen from the inner peripheral surface of the belt structure.

The radially inner surface 46 of anchor plates 30, 32 respectively, are shaped so as to provide at least one projection 50 for engaging the corresponding grooves 16 on the radially outer surface of the tire 12. Projection 50 may be molded or provided by adhering a molded rubber spacer thereto with the appropriate configuration. The radially inner surface 54 of the belt-reinforcing structure 18 between adjacent anchor plates 30, 32 and axially outward thereof is also provided with a plurality of projections 56 shaped so as to provide a mating arrangement with grooves 16 of the supporting structure 12. This can best be seen by referring to FIG. 5. The mating of projections 50 and 56 with grooves 16 of the supporting structure 12 provides the appropriate axial alignment between the track belt assembly 10 and the supporting structure 12 and also provides a positive means to prohibit the belt from slipping off supporting structure 12.

Figure 6:
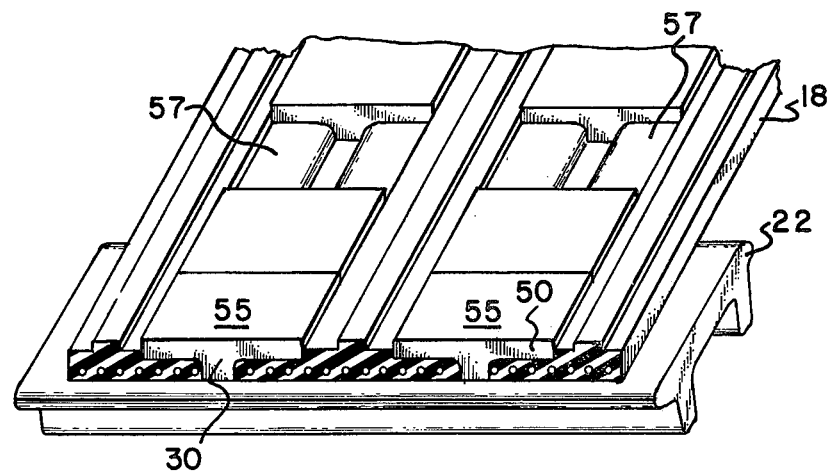
FIG. 6 is a view similar to FIG. 5 illustrating a modified form of the present invention.

The anchor plates may take a variety of shapes. In a modified form of the present invention illustrated in FIG. 6, the radial inner surface 55 of anchor plates 30, 32 is smooth. The belt reinforcing structure 18 is provided with a recess 57 for providing axial alignment of the anchor plates and also has the appropriate projection 56 for mating with grooves 16 on the tire 12.

Figure 7:
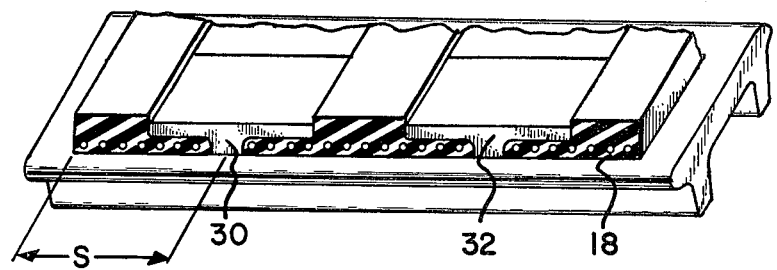
FIG. 7 is a view similar to FIG. 5 illustrating another modified form of the present invention.

Referring to FIG. 7, there is illustrated yet another modified form of the present invention wherein the anchor plates 30, 32 are completely recessed into the belt reinforcing structure 18. The outer peripheral surface of the tire 12 having a corresponding configuration.

An important aspect of the present invention is that the fastening means of the anchor plates is located between the lateral edges of the belt reinforcing structure. This reduces the bending stress in the shoes and stress in the fastening means by reducing the maximum moment arm between any force that may be applied to the track assembly and the fastening means. Additionally, the present invention minimizes any interference between the fastening means and tire carcass which is experienced during deflection of the tire by track belt assemblies of the prior art wherein the fastening means are located axially outwardly of the lateral ends of the belts.

Figure 8:
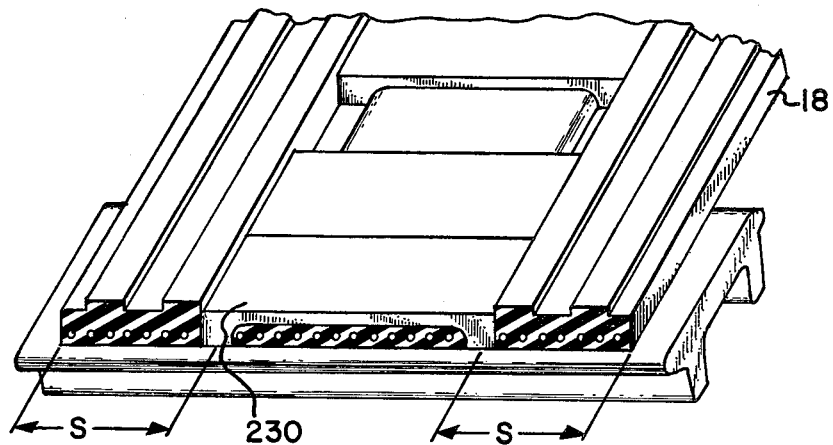
FIGS. 8 and 9 are views similar to FIG. 5 illustrating yet other modified forms of the present invention.

Referring to FIGS. 8 and 9, there is illustrated yet other modified forms of the present invention wherein a single anchor plate 230 is disposed adjacent the inner peripheral surface of the belt reinforcing structure 18. These embodiments still have the advantages associated with locating the fastening means axially inwardly of the belt edges. In the embodiment illustrated in FIG. 9, anchor plate 230 extends across the entire width of the reinforcing belt structure 18. The threaded openings 37 are spaced a distance S of approximately at least 10 percent of the belt width from the tread edge preferably at least 20 percent and in the particular embodiment illustrated is approximately 25 percent of the belt width BW.

In the embodiments illustrated in the figures, the track belt assembly is removable. However, if desired the belt structure and anchor plates may be integrally formed as a part of the tire or supporting structure.

While certain representative embodiments and details have been shown for the purposes of illustrating the invention, it is apparent to those skilled in the art that various changes and modifications may be made therein without departing from the spirit or scope of the invention.

I claim:

1. An endless track belt assembly comprising:
a reinforcing belt structure having a pair of lateral edges;
a plurality of shoes disposed about the outer periphery of said reinforcng belt structure;
characterized by means securing said shoes to said track belt assembly including at least one anchor plate extending in generally parallel superposition with at least one of said shoes;
said belt structure having a plurality of openings, said openings being disposed between the lateral edges of said belt structure, a portion of said belt structure is disposed between said anchor plate and said shoe, said anchor plate having integrally formed therein at least one projecting mating portion which extends through one of said openings in said belt reinforcing structure to mate with said shoe, said projecting mating portion being disposed solely between the lateral edges of said reinforcing belt structure and having at least one fastening means for engagement with said shoe, said at least one shoe having no fastening means disposed axially outward of said lateral edges of said reinforcing belt structure.

2. In combination, removable track belt assembly, a pneumatic tire, said removable track belt assembly being disposed about the outer periphery of said pneumatic tire, said removable track belt assembly comprising:

a reinforcing belt structure extending about the circumference of said track belt assembly, said reinforcing belt structure having a pair of lateral edges;

a plurality of shoes spaced about the outer periphery of said reinforcing belt structure, each of said shoes having a pair of end portions which extend, respectively, beyond said pair of lateral edges of said reinforcing belt structure;

characterized by means securing said shoes to said track belt assembly including at least one anchor plate extending in generally parallel superposition with at least one of said shoes;

said belt structure having a plurality of openings, said openings being disposed between the lateral edges of said belt structure, a portion of said belt structure is disposed between said anchor plate and said shoe, said anchor plate having integrally formed therein at least one projecting mating portion which extends through one of said openings in said belt reinforcng structure to mate with said shoe, said projecting mating portion being disposed solely between the lateral edges of said reinforcing belt structure and having at least one fastening means for engagement with said shoe, said at least one shoe having no fastening means disposed axially outward of said lateral edges of said reinforcing belt structure.

3. An integral pneumatic tire and track belt assembly comprising:

a reinforcing belt structure integrally formed in the radially outer portion of said tire, said belt reinforcing structure extending about the circumference of said tire and having a pair of lateral edges;

a plurality of removable shoes are spaced about the outer periphery of said reinforcing belt structure, each of said shoes having a pair of end portions which extend, respectively, beyond said pair of lateral edges of said reinforcing belt structure;

characterized by means securing said shoes to said pneumatic tire and track belt assembly including at least one anchor plate disposed in generally parallel superposition with at least one of said shoes, said anchor plate being integrally formed in said tire;

said belt structure having a plurality of openings, said openings being disposed between the lateral edges of said belt structure, a portion of said belt structure is disposed between said anchor plate and said shoe, said anchor plate having integrally formed therein at least one projecting mating portion which extends through one of said openings in said belt reinforcing structure to mate with said shoe, said projecting mating portion being disposed solely between the lateral edges of said reinforcng belt structure and having at least one fastening means for engagement with said shoe, said at least one shoe having no fastening means disposed axially outward of said lateral edges of said reinforcing belt structure.

4. In combination, a removable track belt assembly, an inflatable load supporting structure, said removable track belt assembly being disposed about the outer periphery of said load supporting structure, said removable rack belt assembly comprising:

a reinforcing belt structure extending about the circumference thereof, said reinforcing belt structure having a pair of lateral edges;

a plurality of shoes spaced about the outer periphery of said reinforcing belt structure, each of said shoes having a pair of end portions which extend, respectively, beyond said pair of lateral edges of said reinforcing belt structure;

characterized by means securing said shoes to said track belt assembly including at least one anchor plate extending in generally parallel superposition with at least one of said shoes;

said belt structure having a plurality of openings, said openings being disposed between the lateral edges of said belt structure, a portion of said belt structure is disposed between said anchor plate and said shoe, said anchor plate having integrally formed therein at least one projecting mating portion which extends through one of said openings in said belt reinforcing structure to mate with said shoe, said projecting mating portion being disposed solely between the lateral edges of said reinforcing belt structure and having at least one fastening means for engagement with said shoe, said at least one shoe having no fastening means disposed axially outward of said lateral edges of said reinforcing belt structure.

5. The invention according to claims 1, 2, 3 or 4 further characterized by said means securing said shoes to said track belt assembly including two anchor plates, said anchor plates being spaced apart so as to not touch each other.

6. The invention according to claims 1, 2, 3 or 4 further characterized by said anchor plate being provided with at least one clamping surface, the total clamping surface of said anchor plates across the width of said belt reinforcing structure is at least 25 percent of the belt width.

7. The invention according to claims 1, 2, 3 or 4 further characterized in that said projecting mating portion and said openings of reinforcing belt structure are disposed a distance from said lateral edges, of said reinforcing belt structure, of at least 10 percent of the belt width.

8. The invention according to claims 1, 2, 3 or 4 further characterized by said anchor plates having two fastening means for engagement with said shoe.

9. The invention according to claims 1, 2, 3 or 4 further characterized by said anchor plates having two fastening means for engagement with said shoe, said projecting mating portion and opening in said reinforcing belt structure being disposed a distance from said lateral edges of said reinforcing belt structure of at least 16 percent of the belt width.

10. The invention according to claims 1, 2, 3 or 4 further characterized by said anchor plate having a clamping surface which extends across the width of said belt reinforcing structure a distance of at least 40 percent of the belt width.

11. The invention according to claims 1, 2, 3 or 4 further characterized by means securing said shoes to said track belt assembly including two anchor plates extending in generally parallel superposition with said shoes;

said projecting mating portions of each anchor plate and said opening in said reinforcing belt structure are disposed at a distance from each said lateral edge, respectively, of said reinforcing belt structure at least ten percent of the belt width.

12. The invention according to claims 1, 2, 3 or 4 further characterized by said means securing said shoes to said track belt assembly including two anchor plates, said anchor plates being spaced apart so as to not touch each other;

each of said anchor plates having at least one clamping surface, the total clamping surface of said anchor plates across the width of said belt reinforcing structure is at least 25 percent of the belt width.

13. The invention according to claims 1, 2, 3 or 4 further characterized by said means securing said shoes to said track belt assembly including two anchor plates, said anchor plates being spaced apart so as to not touch each other;

each of said anchor plates having at least one clamping surface, the total clamping surface of said anchor plates across the width of said belt reinforcing structure is at least 25 percent of the belt width;

said projecting mating portion and said opening of said reinforcing belt structure are disposed a distance from each belt edge, respectively, a distance of at least ten percent of the belt width.

14. The invention according to claims 1, 2, 3 or 4 further characterized by said means securing said shoes to said track belt assembly include two anchor plates, said anchor plates being spaced apart a distance of approximately 15 percent of the belt width.

15. The invention according to claims 1, 2, 3 or 4 further characterized by said means securing said shoes to said track belt assembly include two anchor plates spaced a distance apart of approximately 15 percent of the width, said anchor plates having a total clamping surface equal to at least 40 percent of said belt width, each of said anchor plates having its projecting mating portion disposed a distance from each of said lateral edges, respectively, a distance of approximately 16 percent of the belt width.

* * * * *